(12) United States Patent
Romijn et al.

(10) Patent No.: US 7,664,745 B2
(45) Date of Patent: Feb. 16, 2010

(54) INFORMATION RETRIEVAL SYSTEM AND METHOD FOR RETRIEVING INFORMATION

(75) Inventors: Onno Romijn, Rotterdam (NL); Timotheus J. W. M. Janssen, Beuningen (NL)

(73) Assignee: Océ-Technologies B.V., Venlo (NL)

( * ) Notice: Subject to any disclaimer, the term of this patent is extended or adjusted under 35 U.S.C. 154(b) by 390 days.

(21) Appl. No.: 10/866,872

(22) Filed: Jun. 15, 2004

(65) Prior Publication Data

US 2005/0021553 A1    Jan. 27, 2005

(30) Foreign Application Priority Data

Jun. 16, 2003    (EP) .................... 03076849

(51) Int. Cl.
*G06F 7/00* (2006.01)
*G06F 17/30* (2006.01)

(52) U.S. Cl. .................. 707/4; 707/102; 707/104.1

(58) Field of Classification Search .............. 707/1–6; 715/700
See application file for complete search history.

(56) References Cited

U.S. PATENT DOCUMENTS

| | | | | |
|---|---|---|---|---|
| 6,108,686 | A * | 8/2000 | Williams, Jr. ............... | 709/202 |
| 6,288,716 | B1 * | 9/2001 | Humpleman et al. ........ | 715/733 |
| 6,460,034 | B1 * | 10/2002 | Wical .......................... | 707/5 |
| 6,519,631 | B1 * | 2/2003 | Rosenschein et al. ....... | 709/217 |
| 6,816,965 | B1 * | 11/2004 | Moore et al. ................ | 713/158 |
| 6,874,123 | B1 * | 3/2005 | DeStefano ................... | 715/234 |
| 7,165,080 | B2 * | 1/2007 | Kotcheff et al. ............. | 707/203 |
| 2002/0052894 | A1 * | 5/2002 | Bourdoncle et al. ......... | 707/513 |
| 2002/0152113 | A1 * | 10/2002 | Butz ........................... | 705/11 |
| 2003/0023607 | A1 | 1/2003 | Phelan et al. | |
| 2003/0078766 | A1 * | 4/2003 | Appelt et al. ................. | 704/9 |
| 2003/0123443 | A1 * | 7/2003 | Anwar ......................... | 370/392 |
| 2003/0126235 | A1 * | 7/2003 | Chandrasekar et al. ...... | 709/220 |
| 2004/0019588 | A1 * | 1/2004 | Doganata et al. ............. | 707/3 |
| 2005/0021553 | A1 * | 1/2005 | Romijn et al. ................ | 707/102 |

FOREIGN PATENT DOCUMENTS

WO    WO 02/061622 A2    8/2002

OTHER PUBLICATIONS

SIS- Graphical Analysis Interface User's Manual Version 2.3, Nov. 2000 pp. 3-49.

* cited by examiner

*Primary Examiner*—John R. Cottingham
*Assistant Examiner*—Susan F Rayyan
(74) *Attorney, Agent, or Firm*—Birch, Stewart, Kolasch & Birch, LLP (57) ABSTRACT

An information retrieval system and method are provided. The system includes a retrieval unit for combining query type of searches and browsing type of searches. A user forms a query by selecting predefined queries, predefined data categories and entering data. The system indicates which combinations are allowed given the available stored data. Results are displayed as a result set. Data from the result can be clicked upon for insertion into a new query.

15 Claims, 11 Drawing Sheets

Find Reports that:
- [ ] are written by the same authors
- [ ] refer to this report
- [ ] are referred to by this report
- [ ] are written by people that have published together with this author
- [ ] are sent to people that have received this report Find

| Experts on a Topic | Related Topics | List of Reports |
|---|---|---|
| Find Topic in: ☐ Title<br>☐ Keywords<br>☐ Abstract<br>☐ Full text | Find Topic in: ☐ Title<br>☐ Keywords<br>☐ Abstract<br>☐ Full text | Find Topic in: ☐ Title<br>☐ Keywords<br>☐ Abstract<br>☐ Full text<br><br>Find name in: ☐ Author field<br>☐ To-list<br>☐ CC-list |
| Correspondence<br><br>Find Topic in: ☐ Title<br>☐ Keywords<br>☐ Abstract<br>☐ Full text<br><br>Find name in: ☐ Author field<br>☐ To-list<br>☐ CC-list | History of a Topic<br><br>Find Topic in: ☐ Title<br>☐ Keywords<br>☐ Abstract<br>☐ Full text | Find report in: ☐ Title<br>☐ TR no |

|  | People | Topics | Reports |
|---|---|---|---|
| I want to know | Experts on a topic<br>Co-authors  People<br>History of a person<br>Correspondence | Related topics<br>History of a topic | List of reports<br>Title page<br>Full text<br>References<br>More reports like this |

|  | Name | Topic | Report | Date |
|---|---|---|---|---|
| I know | Pieter |  |  |  |

1101

Correspondence regarding Pieter

| Authors | Reports | Topic(s) | Recipients | Date |
|---|---|---|---|---|
| Pieter Marc | ADD | Browsing hyperlinks | Roel | 30-11-2001 |
| Pieter Eric | URD | browsing | Ruud | 02-06-1999 |
| Pieter | URD | Browsing internet | Roel | 19-06-1999 |

Bookmark this search   Search history   Edit search parameters   Submit

FIG. 11

INFORMATION RETRIEVAL SYSTEM AND METHOD FOR RETRIEVING INFORMATION

The present application claims, under 35 U.S.C. §119, the priority benefit of European Patent Application No. 03076849.3 filed on Jun. 16, 2003, the entire contents of which are herein fully incorporated by reference.

BACKGROUND OF THE INVENTION

1. Field of the Invention

This invention relates to an information retrieval system, a method for retrieving information from a data base system, a computer program for carrying out the method and a computer readable medium having the computer program thereon.

2. Discussion of Background Art

The usage of queries to retrieve information from databases is well known in the art. A query is a command, created by the user and conforming to a well defined syntax, that makes a selection from the data available in the database. The item a user wants to retrieve information about is referred to herein as a 'search subject'. The data on which the query is to be carried out is referred to herein as an 'information space'. The data that is returned as a response to the query is referred to herein as a 'result set'. The result set may be used as information space for a next query and so on until the information the user is after has been found. In this way the information space is stepwise reduced, until the goal, which is what the user wants to know about the search subject, of the search has been reached.

Another method of retrieving information, well known in the art, is so called browsing. Browsing relies on a link structure. An example of browsing is a set of HTML pages provided with hyperlinks. The user will start from a start page, choose a link, get a next page, again may choose a link and so on, until he has found the information he is after. Each step moves the user from one location in the information space to another.

In general one can state that a browsing strategy is more suited for an exploratory search, while a querying strategy is more suited for a specific search.

Traditional query systems retrieve results by comparing the terms in a query formulated by the information seeker with terms in individual documents. Only the documents in the corpus that match the terms mentioned in the query are then retrieved. This procedure puts a heavy burden on users to formulate the right query and in the case of a limited amount of domain knowledge, may cause severe cognitive load.

One of the main advantages of querying is that it does not require an intricate link structure. One only has to construct an inverted file, which can be done automatically. This allows a user complete freedom in specifying his query, but at the same time it does not give him any clues about the information contained within the database. Formulating the right query therefore heavily relies on the user's knowledge about the specific domain.

A disadvantage of browsing is that a link structure has to be available. Traditionally, the link structure is created manually, which is quite labour intensive. This seriously hampers the applicability of browsing methods. Above that, while navigating through an information space, a user does not have complete freedom of choice, since only a limited number of links are available. Although this limits the number of possible search paths, it may actually guide a user through the information space.

Also most of the time it is not clear to the user whether the information space at a certain moment in the search process indeed contains the type of information he is looking for. Nowadays available information retrieval systems offer the information seeker too little feedback about that.

It would therefore be beneficial to have available a system that integrates best of both the query and browsing methods so that a user easily can switch between these methods and can optimize his search strategy.

SUMMARY OF THE INVENTION

To overcome the drawbacks of the information retrieval systems of the background art, the information retrieval system according to the invention comprises a combination of elements for: storing a set of predefined queries and set of predefined data categories; selecting a predefined query from the set of predefined queries; selecting at least one data category from the set of predefined categories; entering at least one first data item by an operator, and associating the at least one first data item with the at least one selected data category; forming a query based on the selected predefined query, the at least one selected category and the at least one associated first data item; submitting the query; receiving a result set including records and fields in the records, in response to the submitted query; and displaying the received result set.

In this way the user is aware what kind of queries are available for the available information space and what kind of categories of data items are available for the available information space.

In a further embodiment of the information retrieval system according to the invention, where the result set comprises second data items associated with a predefined data category and stored in fields, the system further comprises a combination of elements for: selecting a second data item from the result set and moving the second data item to a data entry unit as a first data item in conformance with the associated predefined data category.

In this way browsing and querying are integrated into one system. This offers the possibility to reduce or enlarge the information space. The present system combines querying and extending the result set (in the art also known as 'pearl growing') through hyperlinks to get the best of two worlds: the help of hyperlinks and the full range of options for querying. By converting each link into a query the link seizes to be a one-to-one relation. It now becomes possible to add query terms to the link and make combinations between different links.

In a further embodiment the information retrieval system according to the invention comprises a first limiting unit for limiting the set of predefined queries upon selection by a user of predefined categories; and a second limiting unit for limiting the set of predefined categories upon selection by a user of a predefined query.

This informs the user what kind of combinations of search subject and goal the available information space allows for. Without this mechanism, a user would have to wait for the system to render results to find out that nothing relevant was found.

The invention also relates to a method for retrieving information from a database system using a computer display device and a user interface that provides outputs on the computer display device, the method comprising the steps of: displaying a set of user selectable predefined queries; displaying a set of user selectable categories with associated entry fields for reception of user defined data items; submitting a query based upon a user selected predefined query and at least one user selected category with a user defined data item upon confirmation by a user; and displaying a result set in response to the submitted query.

The invention further relates to a computer program embodied on a storage medium and capable of running on a computer so that the computer running this program is capable of carrying out one or more of the steps of the method (s) of the invention.

The invention will now be explained with reference to the following exemplified embodiments of the present invention, and illustrated by reference to the drawings. The embodiments serves to illustrate the invention and should not be regarded as a limitation thereof.

BRIEF DESCRIPTION OF THE DRAWINGS

The invention will be explained in detail with reference to the accompanying drawings wherein.

DETAILED DESCRIPTION OF THE PREFERRED EMBODIMENTS

Figure 1:
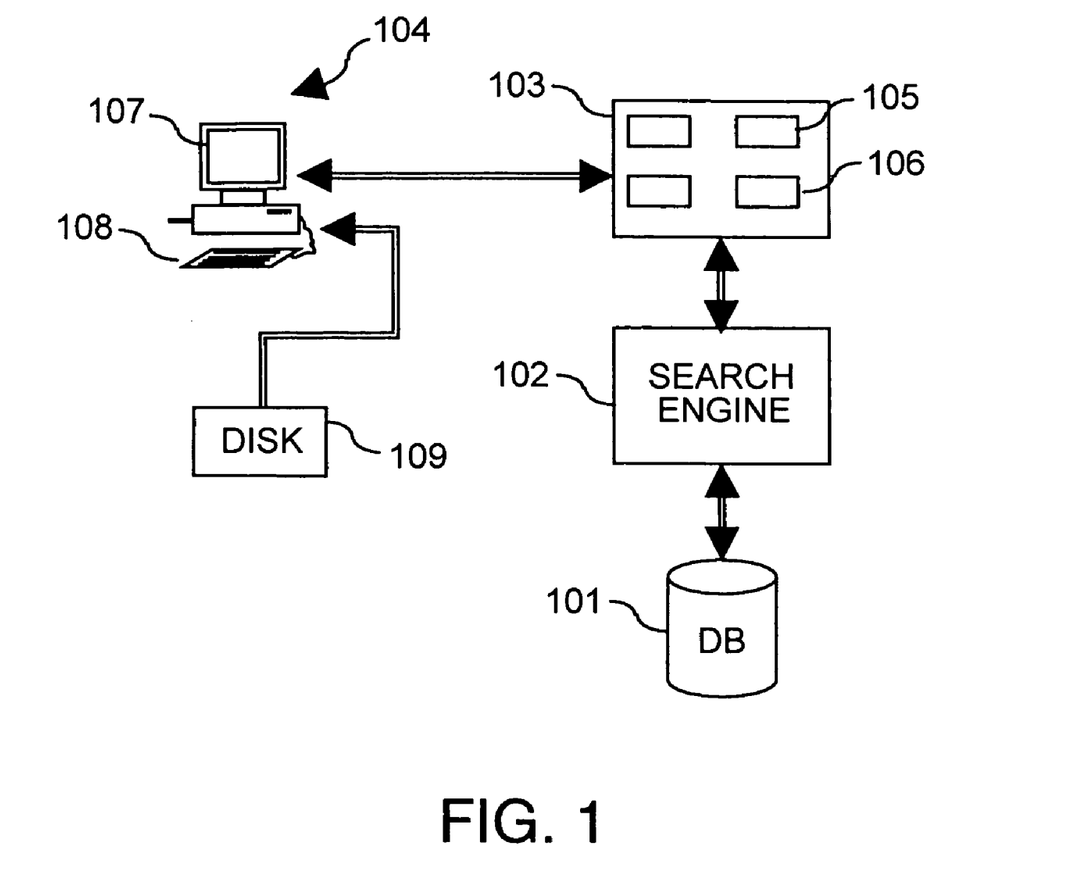
FIG. 1 shows an embodiment of a document management system according to the invention.

FIG. 1 diagrammatically illustrates an embodiment of a document management system according to the invention. Referring to FIG. 1, the document management system comprises a database (101), a search engine (102), a search engine front end (103) and an operator console (104). The database (101) contains data to search for. The search engine (102) carries out queries on the database (101) and takes care that search results are returned to the submitter. The search engine front end (103) converts all data that is received from the operator console (104) into a query to be carried out by the search engine (102). The search engine front end (103) comprises a memory for storing a set of predefined queries (105) and a memory for storing a set of categories (106). Such queries and categories can be stored in one or more memory units.

The operator console (104) provides the user interface to the system according to the invention. It is at least provided with a display (107) and a data entry part, e.g. a keyboard (108), a mouse, etc.

Many variations of the system are possible. For example, in a first variant all components of the system may be incorporated into one personal computer. In a next variant, the search engine, search engine front end and database are embodied in a server, and numerous operator consoles embodied as workstations may access as client the server via a network such as the Internet, an intranet, an extranet, etc., and may use a web browser as access means to the server. Also the search engine and search engine front end may be embodied as one component. A recording medium such as a disk 109 or hard drive of a computer can be used to implement the processing steps of the invention.

Figure 2:
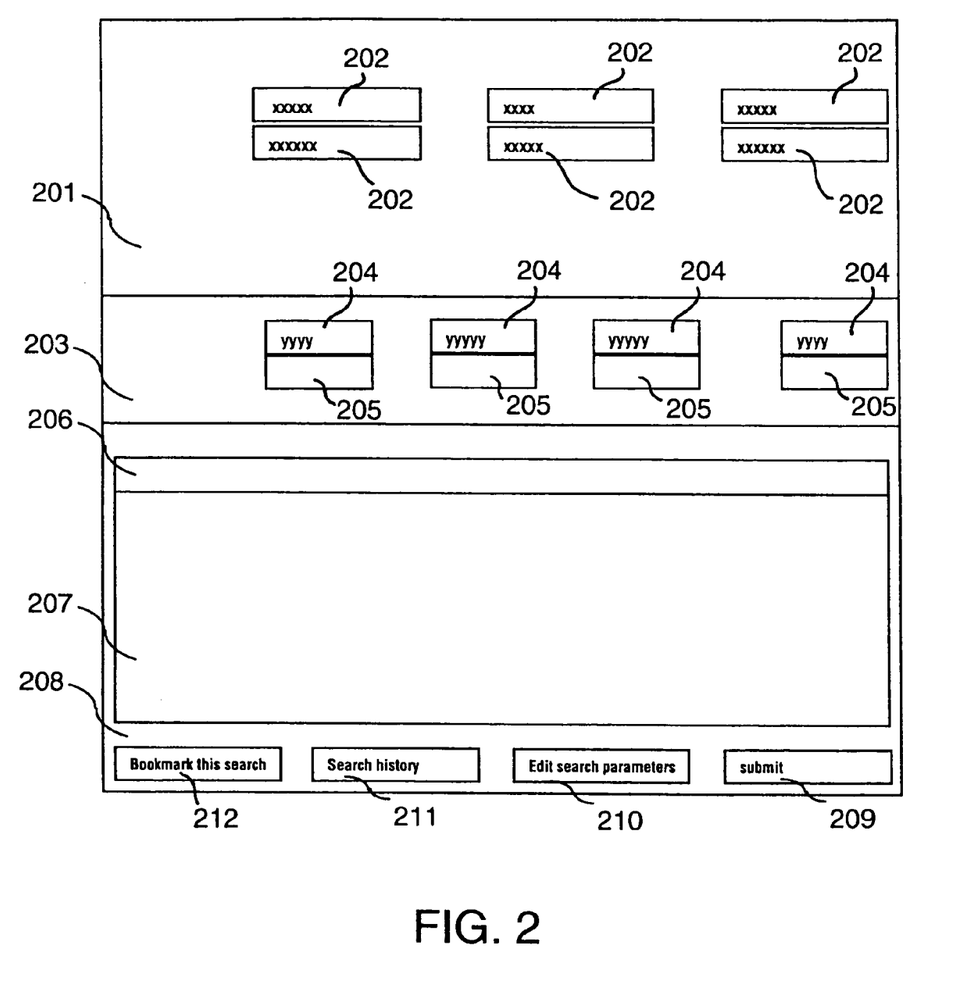
FIG. 2 shows an embodiment of a main user interface screen usable in the invention.

FIG. 2 presents an embodiment of a main user interface screen according to the invention. The main user interface screen can be implemented at the display (107) or other suitable means. Referring to FIG. 2, the screen comprises a first area (201) or a query area providing user operable buttons (202) each representing a particular predefined query, a second area (203) or a data area comprising user operable buttons (204) each representing a data category and an associated data entry field (205), a third area (206) for display of a submitted query, a fourth area (207) or a result area for display of query results, and a fifth area (208) for providing user operable buttons for a variety of support, e.g., a submit button (209), an edit search parameters button (210), a search history button (211), and a bookmark this search button (212).

Activating a button is done by selecting the button and clicking on it. The buttons in the query area (201) and the data area (203) are selection buttons. In a first embodiment a selection button has one of the states of non-selectable, selectable and selected. Activating a button in the selectable state brings the button in the selected state. Activating a button in the non-selectable state leaves the state unchanged. Activating a button in the selected state brings the button in the selectable state. A state can be indicated by a color of the button, e.g., selectable and selected state are indicated with green and bright green respectively, and in the non-selectable state the button is greyed out. Other schemes can be used to indicate the states of the buttons. From the buttons in the query area (201), only one button can be selected at any time; from the buttons in the data area (203) one or more buttons can be selected at any time.

The system according to this embodiment of the invention offers a monolithic display in which both the input fields and output fields are laid out in predefined positions and are simultaneously viewable. This allows users to see dynamic interactions between the query area and data area and between the result set and the data area.

Figure 3:
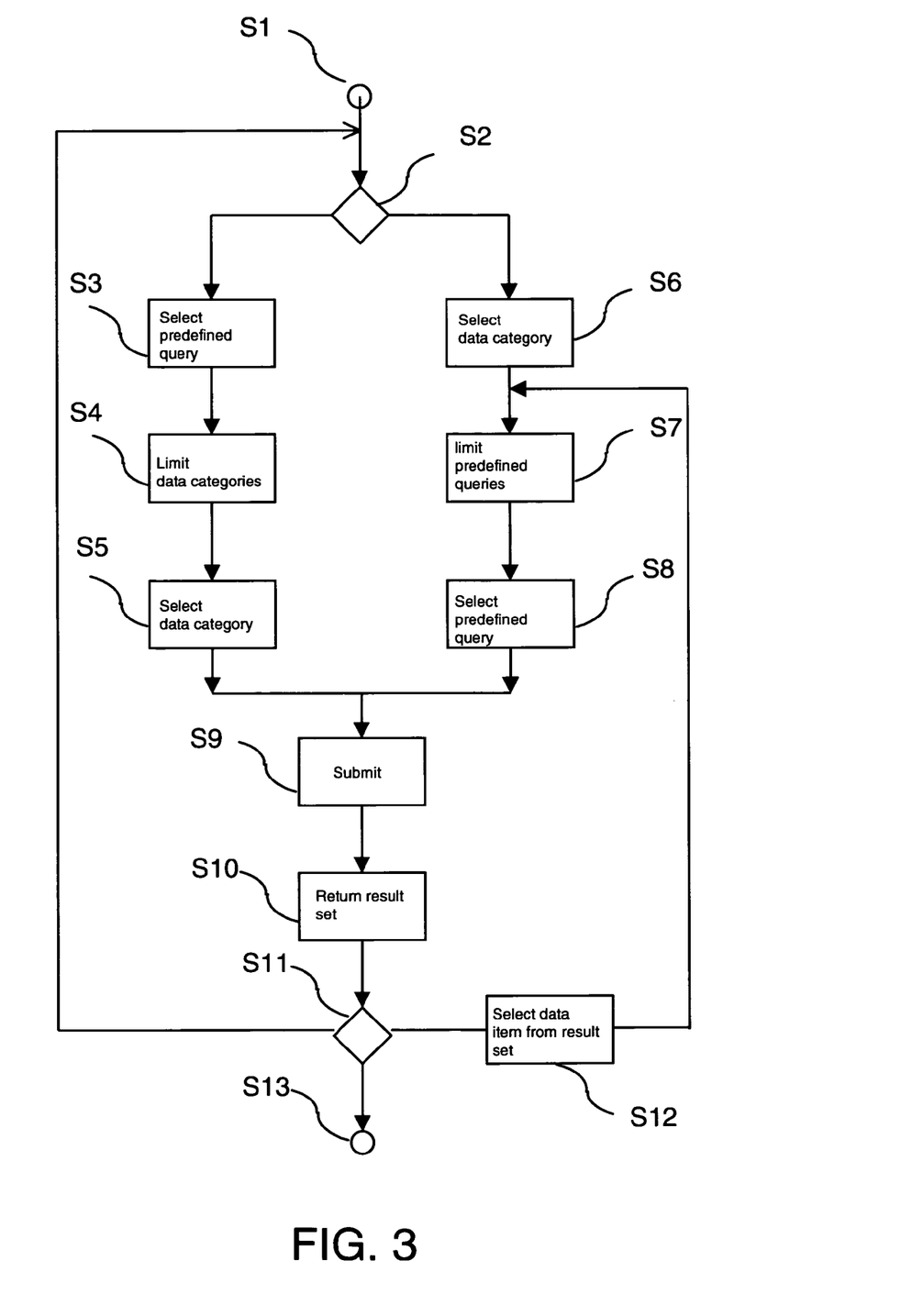
FIG. 3 shows a first embodiment of an information retrieval method according to the invention.

FIG. 3 shows a flowchart for illustrating the steps of the method according to the first embodiment of the invention and will be explained with reference to the user interface screen of FIG. 2.

After accessing the system, all selection buttons are selectable. The user then has the choice (S2) to select a predefined query or to select a data category. In case he selects a predefined query (S3) the set of user selectable data categories may be limited and as a consequence inappropriate buttons will be made non-selectable (S4). Next the user selects an enabled data category (S5). After selection of the category he will enter also the data item in the then activated data field.

In case at S2 he decides to select a data category, this selection is made at S6 by activating the desired selection button and subsequently entering a data item in the activated data field. In the next step the set of user selectable predefined queries will be limited (S7). The user selects then a predefined query from the limited set of predefined queries (S8). After this step and also after step S5, the user has to activate the submit button to submit the thus formulated query to the search engine (S9). The search engine returns a result set (S10) that will be displayed in the result area of the user interface screen. The result set may comprise fields containing data that are selectable. In step S11 the user may now choose to finish his search (S13), to define a new search (S2), or to select a selectable data item from the result set. In the latter case at step S12, the data items selected are entered automatically in the corresponding data item fields and the corresponding buttons are selected. Subsequently step S7 will be carried out and a new query will be formulated with the data items found as starting point.

Figure 4:
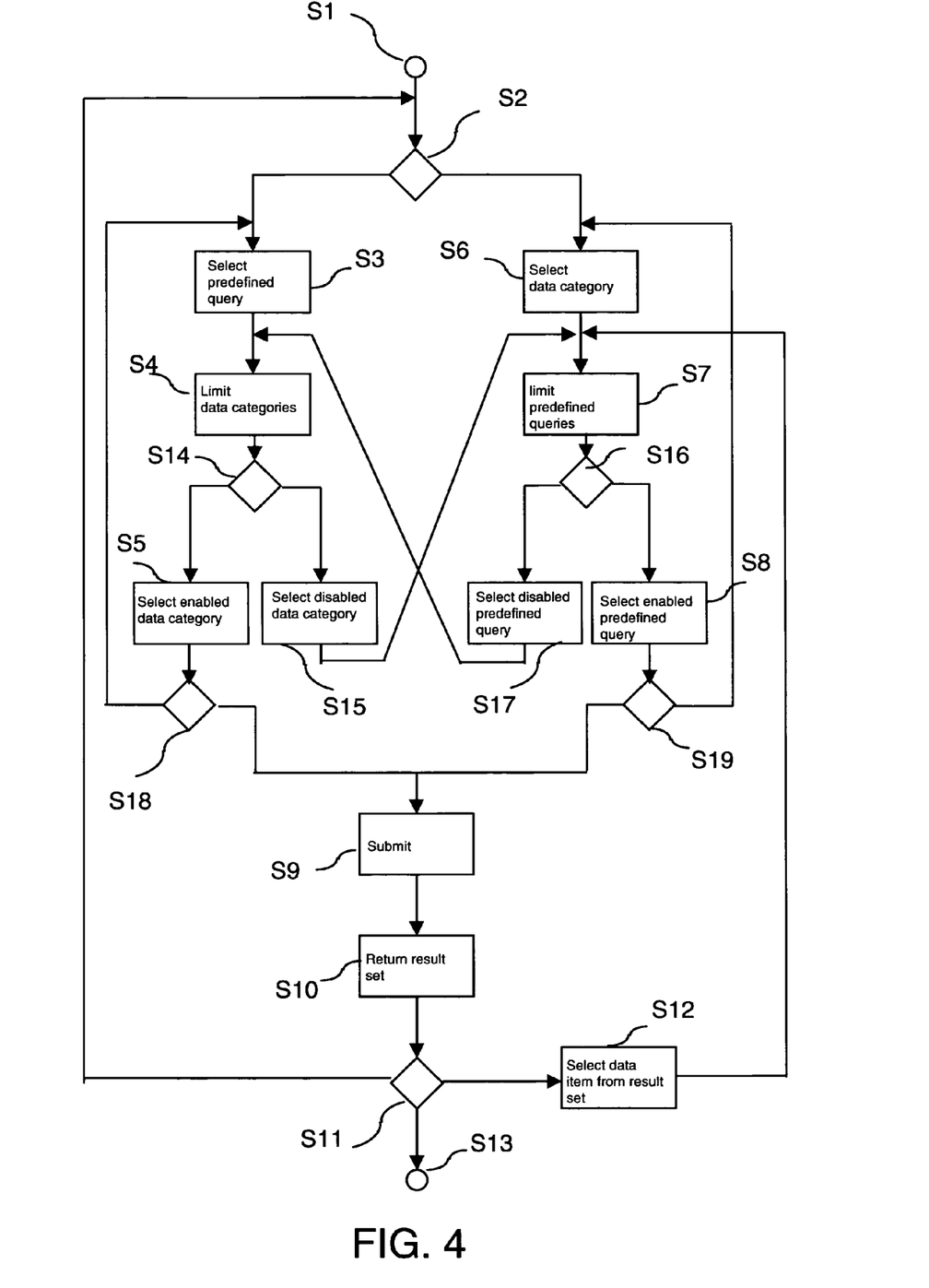
FIG. 4 shows a second embodiment of an information retrieval method according to the invention.

A second embodiment of the method according to the invention will now be described with reference to FIG. 4. FIG. 4 illustrates a method according to the invention as presented in FIG. 3, provided with two additional switch points S14 and S16, two additional steps S15 and S17, and two additional decision points S18 and S19. All steps in FIG. 4 that are identical to the steps of FIG. 3 have same reference numbers.

For the second embodiment the behaviour of the selection buttons is modified. Selection buttons now have one of the three states of: selectable, non-selectable for the current query but selectable for another query, and selected. Corresponding colors of the states are respectively, e.g., green, orange and bright green, but other colors or schemes can be used. In comparison with the first embodiment, the non-selectable state is now replaced by a non-selectable state that however can be overruled by a user. If overruling takes place, the system adapts settings previously made by the user so that the new selection is accommodated by the system.

With reference to FIG. 4 after steps S3 and S4, where the user has selected a predefined query and the set of user selectable data categories is limited, at the switch point S14 the user selects a selectable button (S5) in the data area or he selects a non-selectable button in the data area (S15). In the latter case (S15) the method continues with step S7, where the set of user selectable predefined queries will be limited. In the same way, after step S7 at decision point S16, the user selects a selectable button in the query area (S8) or he selects a non-selectable button (S17). In the latter case (S17) the method continues with step S4.

Also in this embodiment, after selection of a data set in step S5 the user may decide now at decision point S18 to submit the query at step S9 or to change the selected query at step S3. In the same way, after selection of a query in step S8, the user may decide now at decision point S19 to submit the query at step S9, or to change the selected data set at step S6.

In this way the user can easily switch back and forth between the query area and the data area to eventually come to a query and data combination that he will submit at step S9.

The steps of FIGS. 3 and 4 can be implemented by the system of FIG. 1 or other suitable device/system.

So in total the user in interaction with the information retrieval system will proceed along a way made up of all different paths provided by the system, going from a result list to a result list up to a result list presenting the information he is after.

The behaviour of buttons, as described above, is new in the art and can also be applied for other applications. Up to now, making selections by means of a clickable area on a computer screen (the clickable area embodied as a button or as a menu list) is implemented by presenting on a screen a number of buttons or menu-items, where buttons or menu-items not selectable in a particular state of the system are greyed out.

The improvement proposed by the present invention comprises providing a button or menu-item of a user interface with a visual indication concerning the state of the button or menu item, the state determining the action to be carried out upon activating the button or menu item and affecting the next state of the button or menu item.

In particular the improvement proposed by the present invention relates to providing a button or menu item of a user interface with a first unselectable state that may be overruled by a user by activating the button and a second unselectable state that may not be overruled by a user by activating the button or menu item.

This leads to a system for processing information comprising a user interface including screens provided with buttons or menu items having a selectable state, a first non-selectable state, and a second non-selectable state, where activating a button in the selectable state selects the particular item for further processing (leaving earlier made selections unchanged), activating a button in the first non-selectable state leaves the state unchanged, and activating a button in the second non-selectable state selects the particular item and overrules one or more of earlier made selections.

Figure 5:
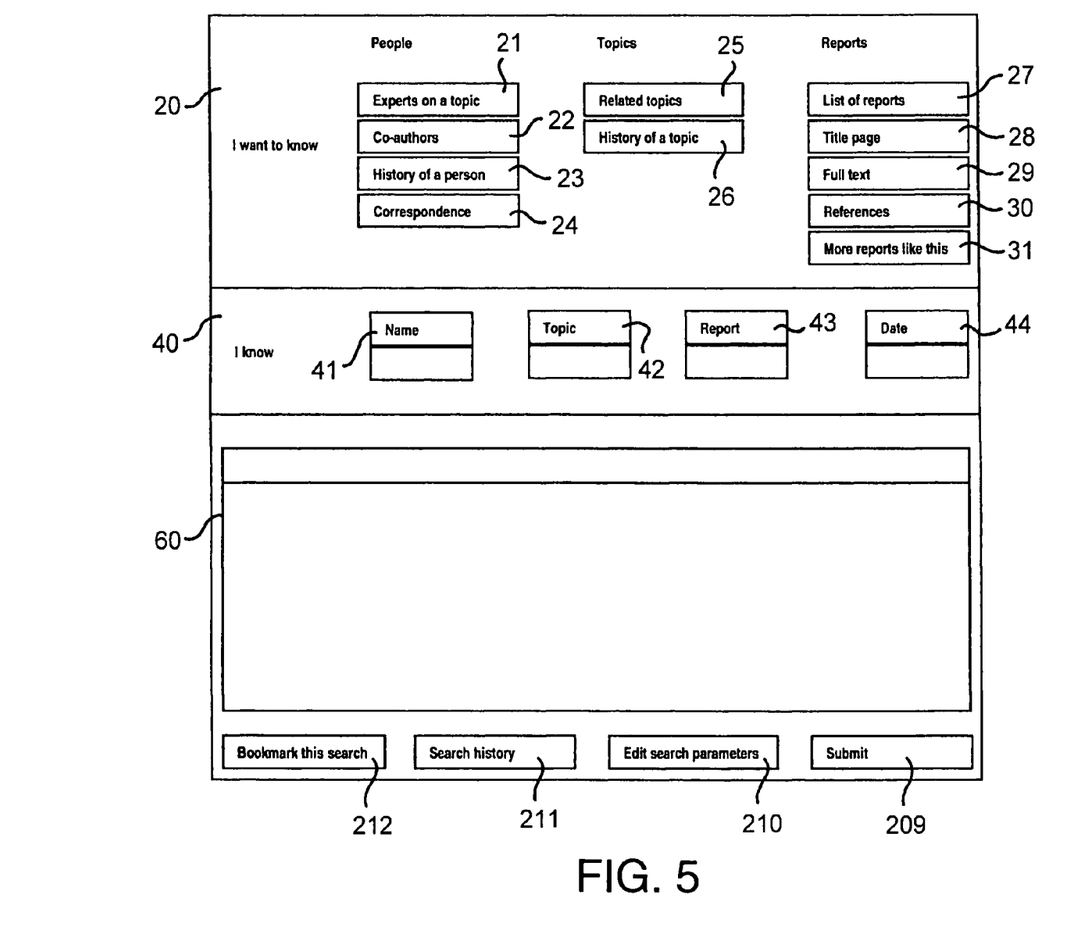
FIG. 5 shows a particular embodiment of the main user interface screen of FIG. 2.

A detailed explanation of an example embodiment of the invention will be given now with reference to FIG. 5. The example embodiment is a document management system for managing a number of technical reports that are stored in the database. FIG. 5 shows an example of a main user interface screen optimized for the given information space formed by the technical reports and all its bibliographical data. This screen has the screen structure shown in FIG. 2, and shows a number of predefined queries and a number of data categories as examples. This example embodiment can be implemented by the system of FIG. 1 in accordance with the present methods discussed above.

Referring to FIG. 5, the example embodiment allows users to accomplish 11 different goals. The goals available for this particular embodiment are given in Table 1 below. Each goal corresponds with a user selectable button in the query area (20) of the main screen, and provides a predefined query. The query area (20) is provided with the indication "I want to know", since in this area the goal of the search, which is what the user wants to know, has to be defined.

TABLE 1

Experts on a topic
Co-authors of a person
History of a person
Correspondence regarding a person, topic, report or date
Topics that are related to a certain topic
History of a topic
Reports regarding a person, topic, word from the title or date
Title page of a report
Full text of a report
References of or to a report
Reports that are related to a certain report The "Experts on a topic"-button (21) is used to select/deselect "Experts on a topic" as a goal for a search. A person is an expert on a specific topic, if he/she has written one or more documents on this topic. The appropriate selection button from the data area (40) is the button "Topic" (42).

The "Co-authors"-button (22) is used to select/deselect "Co-authors" as a goal for a search. A person is a co-author of another person, if he/she has published one or more technical reports together with this person. The appropriate selection button from the data area (40) is the button "Name" (41).

The "History of a person"-button (23) is used to select/deselect "History of a person" as a goal for a search. The history of a person includes information about the departments the person has been part of and the topics the person has written about. The appropriate selection button from the data area (40) is the button "Name" (41).

The "Correspondence"-button (24) is used to select/deselect "Correspondence" as a goal for a search. Searching for correspondence produces a list of reports. For each report the authors and the recipients are listed. The appropriate selection buttons from the data area (40) are the buttons "Topic" (42), "Name" (41), "Report" (43) and "Date" (44).

The "Related topics"-button (25) is used to select/deselect "Related topics" as goal for a search. Two topics are related, if there are one or more documents about both topics. The appropriate selection button from the data area (40) is the button "Topic" (42).

The "History of a topic"-button (26) is used to select/deselect "History of a topic" as a goal for a search. The history of a topic includes all documents which have been published about that topic. The appropriate selection button from the data area (40) is the button "Topic" (42).

The "List of reports"-button (27) is used to select/deselect "List of reports" as a goal for a search. Searching for a list of reports produces a list of reports which comply to all the specified arguments. The appropriate selection buttons from the data area (40) are the buttons "Topic" (42), "Name" (41), "Report" (43) and "Date" (44).

The "Title page"-button (28) is used to select/deselect "Title page" as a goal for a search. Searching for the title page of a report gives a link to its title page as a result. The appropriate selection button from the data area (40) is the button "Report" (43).

The "full text"-button (29) is used to select/deselect "Full text" as a goal for a search. Searching for the full text of a report gives a link to its full text as a result. The full text is the original document itself. The appropriate selection button from the data area (40) is the button "Report" (43).

The "References"-button (30) is used to select/deselect "References" as a goal for a search. It returns a list of reports referred by or referring to a report. The appropriate selection button from the data area (40) is the button "Report" (43).

Figure 6:
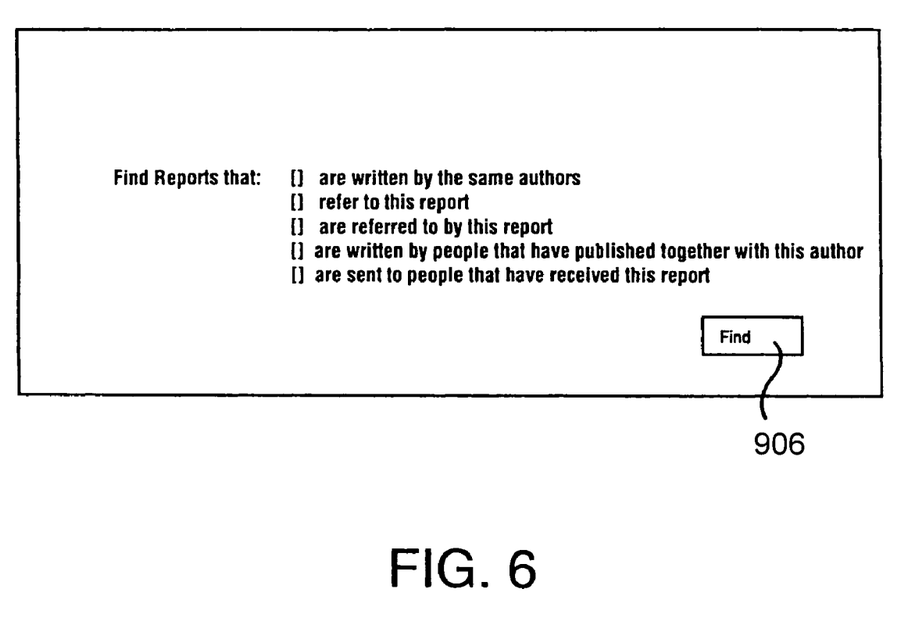
FIG. 6 shows an example of a user interface screen for specifying relations according to the invention.

The "More reports like this"-button (31) is used to select/deselect "More reports like this" as goal for a search. This button can be used to search for reports related to a specific report. Upon selection of this button another screen, shown in, e.g., FIG. 6, opens, where a number of options can be selected to specify the kind of relation. Options available are finding report(s) that: are written by the same author(s); refer to this report; are referred by this report; are written by people that have published together with this author; and are sent to people that have received this report. The appropriate selection button from the data area (40) for this search is the button "Report" (43).

Note that although all goals are based on one and the same database (i.e. the technical reports database), the goals are truly distinct. For each specific goal, a result list with a specific format will be returned by the search engine front end. The corresponding result lists are designed to help accomplish a goal with the least possible effort. This may require the system to present different information, rank it in a different manner, process the information before presenting it, and to search in different meta data fields.

To accomplish one of these goals a user has selected so far, in the next step the user has to specify a search subject. The example embodiment allows the user to define the subject to be searched for as being in one of four data categories: name, topic, report and date (41~44).

In addition, users can make combinations between these four fields to narrow down their result set. Thus, combinations between different fields are characterized by an AND relation. It is also possible to combine items within each field. The user does not have to specify the search operators since the system attributes the highest relevance ranks to the reports that contain the exact phrase, followed by reports that contain all items and the lowest ranks to reports that contain one or more items.

Figure 7:
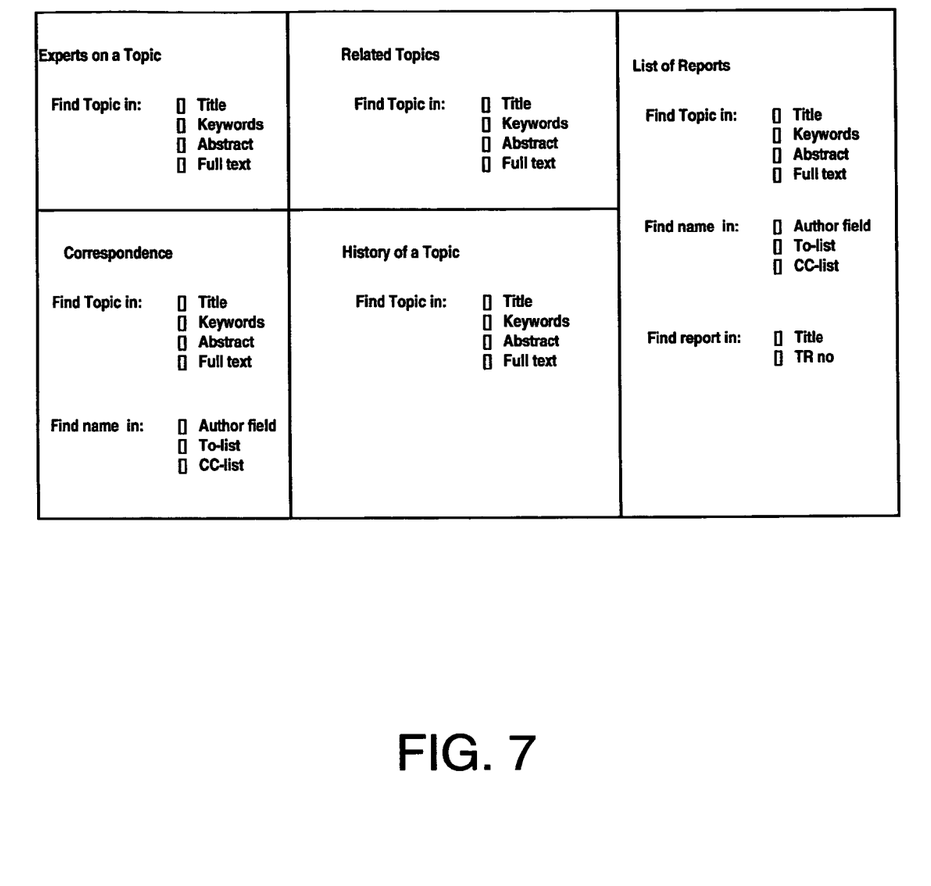
FIG. 7 shows an example of a user interface screen for editing search parameters for predefined queries according to the invention.

A user has the possibility to edit search parameters for the predefined queries. Heretofore the user has to activate button "Edit search parameters" (210). The user is then provided with the screen presented in FIG. 7. For some predefined queries, the user is able to define with which database fields data items have to match. Database fields may be selected by clicking on the associated checkbox.

EXAMPLES

To illustrate the working of the method(s) and system, e.g., as shown in FIGS. 1, 3 and 4, some examples of information seeking will be given by using the screen of FIG. 5 as illustrated in FIGS. 8-11. The present invention, however, is not limited to the given examples, but includes other. A selected button will be indicated by underlined text in it.

Figure 8:
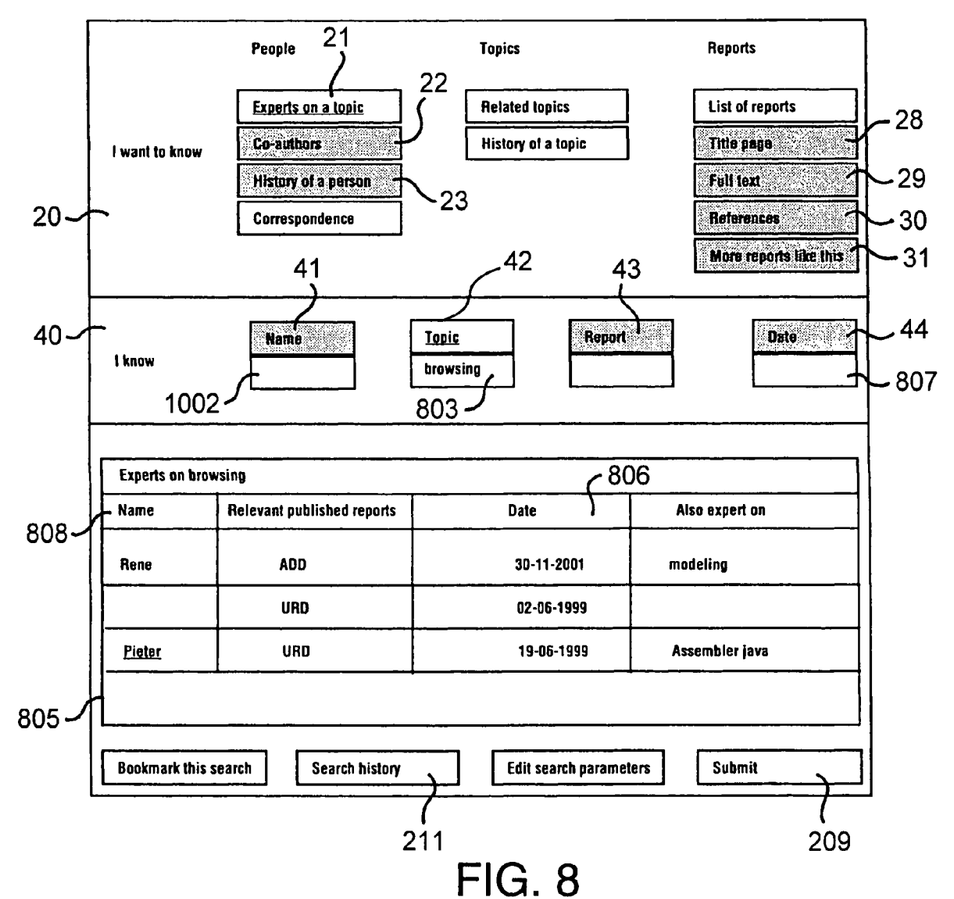
FIGS. 8-9 show exemplary user interface screens with a result set according to the invention.

In a first example as shown in FIG. 8, a user wants to know experts on browsing. In order to search for experts on a topic, the user first clicks on the "Experts on a topic"-button (21) in the query area (20). In response, the "Name" (41), "Report" (43), and "Date" (44) fields in the data area (40) are shaded out since they represent inappropriate inputs for this predefined query. Next he clicks on the "Topic"-button (42) in the "I know" area (40). This will cause a cursor to appear in the input box (803) below the "Topic"-button (42). Furthermore, it will cause the 'co-authors" (22), "History of a person" (23), "Title Page" (28), "Full Text" (29), "References" (30) and "More like this" (31) buttons in the query area (20) to be greyed out, since they represent inadequate queries for the selected input category. Hereafter, the user fills in the topic in the input box: "browsing" (803). Finally the user activates the submit button (209) whereupon the query is sent to the search engine. After executing this sequence of instructions, the system starts searching. When the search has been completed, the results are displayed in the "Results" area (805). An example of the search result is shown in FIG. 8. That is, the submitted request is displayed: "Experts on browsing" (805) and the result list is displayed. The presented result list has a particular structure for this request.

Figure 9:
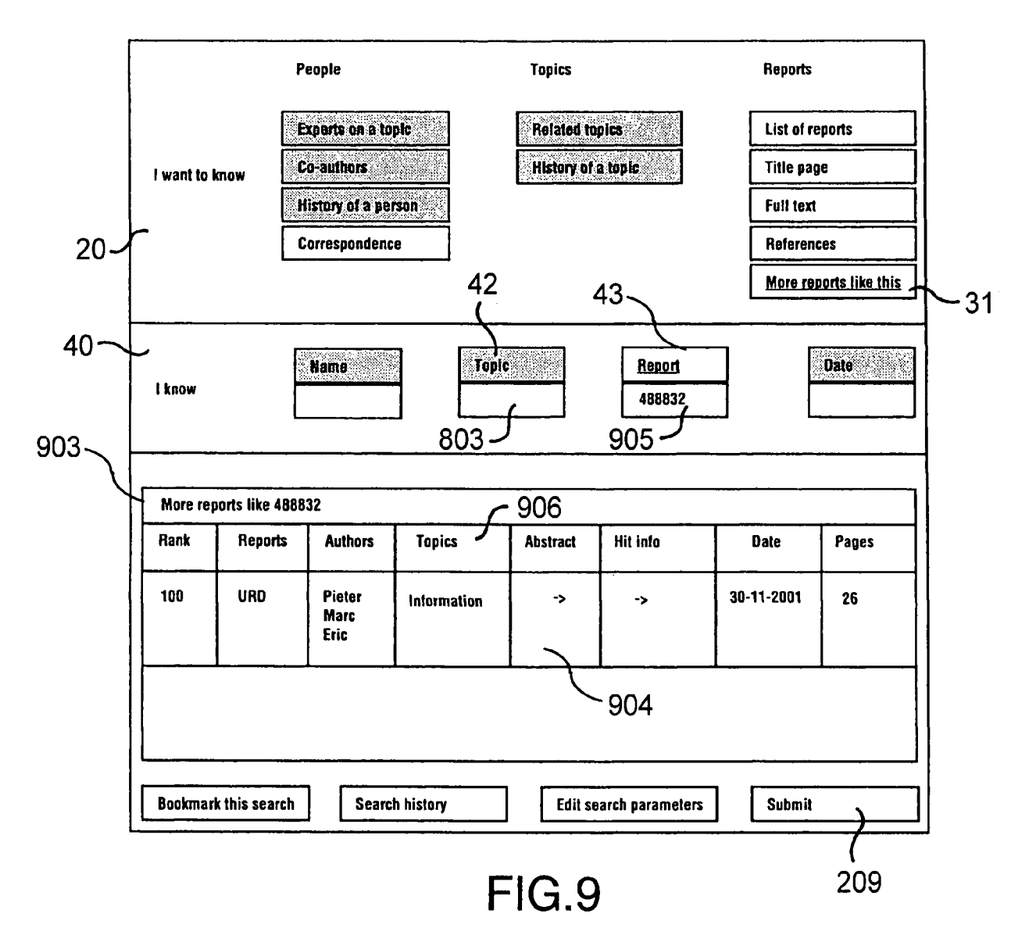

In another example, it is illustrated in FIG. 9 how a user may seek for a report that is similar to a report that he already knows. In order to search for reports that are similar to a specific report, first the user clicks on the "More reports like this"-button (31) in the query area (20). Next he clicks on the "Report"-button (43) in the data area (40). This will cause a cursor to appear in the input box (905) below the "Report"-button (43). A report number has to be filled in the input box (905) by the user. Finally, the user activates the submit button (209). In this case, now, a list of options is displayed as shown in, e.g., FIG. 6. Here the user selects which criteria should be used in the search. After making the selection the user clicks on the "Find"-button (906 in FIG. 6), whereupon the query is sent to the search engine. The search engine carries out the search, and returns the search results. The search results are then displayed in the form of a result list (903 in FIG. 9). Upon selection of the field "abstract" (904) in FIG. 6, the abstract will pop up in a separate window.

Figure 10:
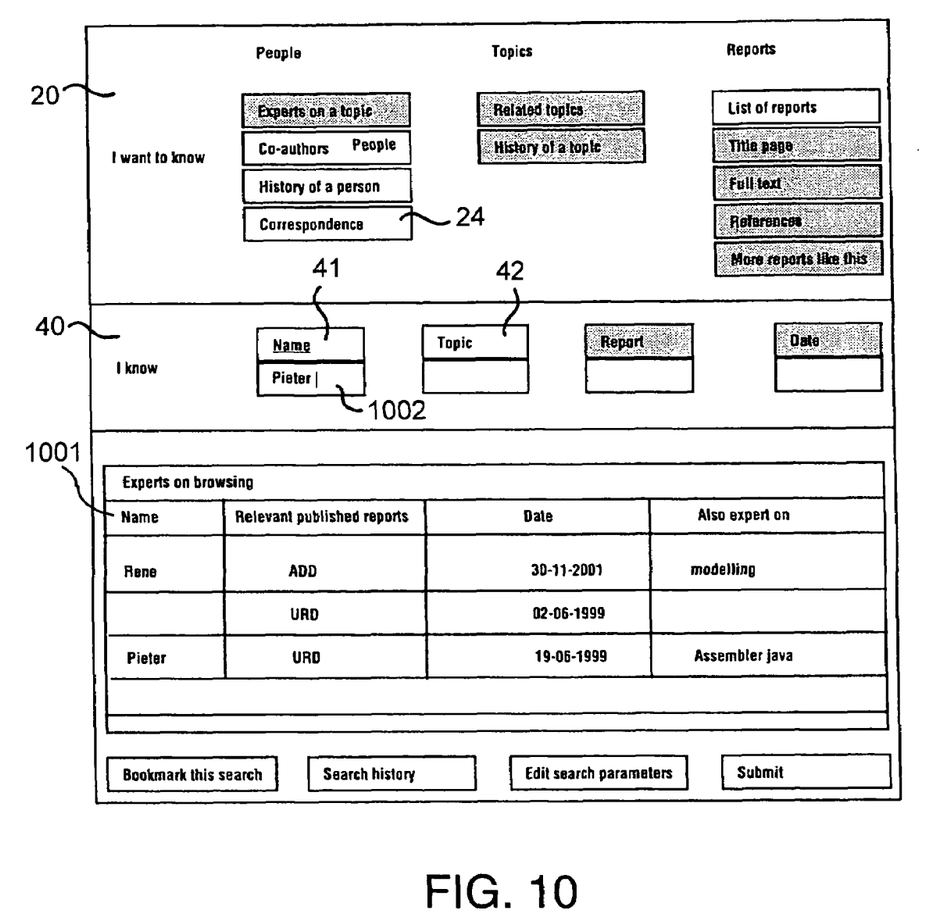
FIG. 10 shows an exemplary user interface screen with a name selected from a result list according to the invention.
Figure 11:
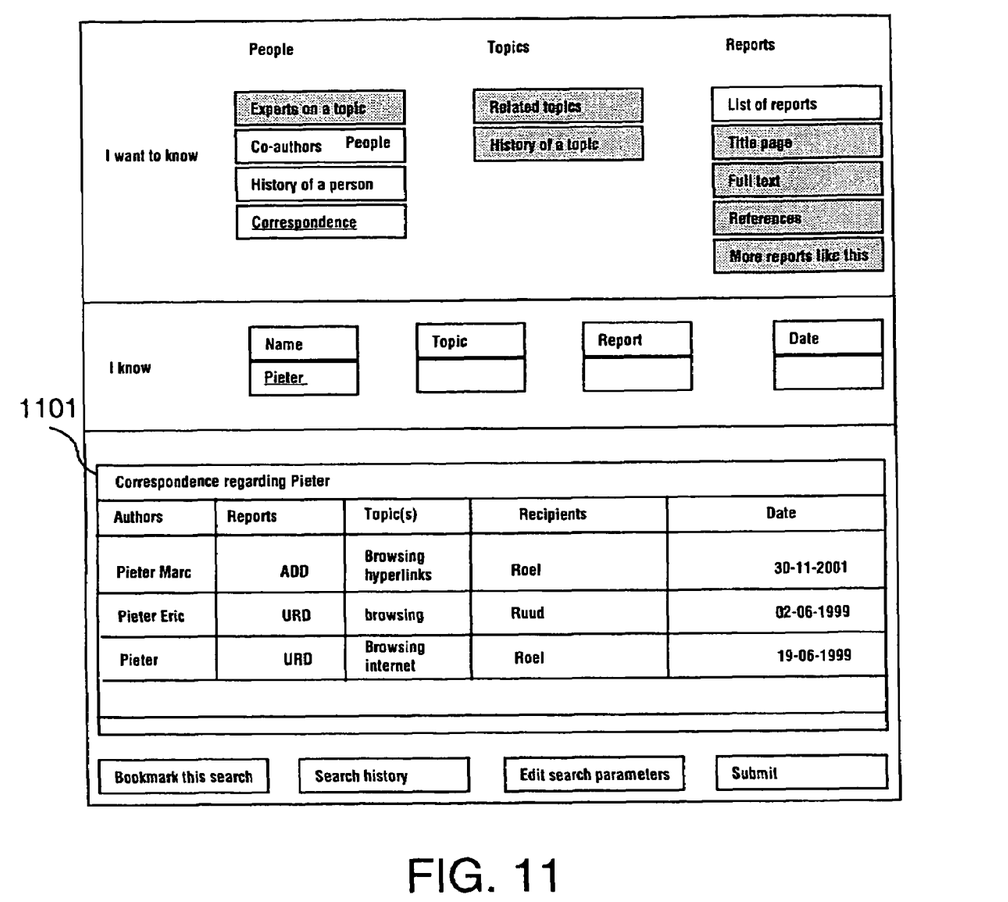
FIG. 11 shows an exemplary user interface screen with a result list regarding correspondence according to the invention.

In another example, it is shown in FIG. 10 how to use the obtained result list for a next search. In this way the result set can be limited or expanded. Starting point is the result list from the first example presented in FIG. 8. In this list all data items are selectable. The user now clicks on one of the names in the "Name"-column (1001 in FIG. 10). This selected name now appears in the "Name" input box (1002) in the data area (40), and the "Name"-button (41) changes its state to the selected state, where at the same time the "Topic"-button (42) changes its state to the deselected state. Furthermore the query buttons in the query area (20) are greyed out as appropriate for the selected data category. An example is shown in FIG. 10. All selectable buttons in the query area (20) can be clicked to start a search with "Name" and "Topic" (41 and 42) from the data area (40). By way of example the user now clicks on "Correspondence"-button (24). This will lead to the result list (1101) shown in FIG. 11.

The link according to the present invention leads to a result set containing three elements. This is distinct from the usage of links of the background art, where a link leads to one other element (the target of the link). According to the present invention, even the set of elements the link leads to is variable; it is now under control of the query formulated by the user. This feature of the present invention is applicable also as such, without all other features of the present invention. On these results the procedure above can be repeated. As an example: after clicking on one of the dates in the "Date"-column (806 in FIG. 8), this date will then be filled in in the "Date" input box (807). Again all selectable buttons in the query area can be clicked to start a search with "Date" as data category.

It is also possible to use the results of a search to quickly define another search with an argument composed of more than one data item. For example, the user clicks on one of the names in the "Name"-column (808). This name is now filled in in the "Name" input box (1002) in the data area (40). Also the "Name"-button (41) is selected. Next, click on another name in the "Name"-column (808), while holding down a designated key, e.g. the (Ctrl)-key on the keyboard or keypad. The selected name is now appended to the contents of the "Name" input box (1002), and all the names will be used now for the new search. Alternatively, "Control+click" on a topic in the Topic column (906 in FIG. 9) would also cause the "Topic"-button (42) to be selected and the selected topic to be filled in in the "Topic" input field (803) of the data area. In this way, complex queries can easily be constructed.

The system according to the present invention saves all result sets it returns, making previous result sets accessible to its users. Because a user specifies both the query and data, the search history is simply a combination of these two. For instance, if a user chooses "Expert on a topic" and selects "browsing" as a topic, the search history simply becomes "I wanted to know experts on browsing". With the "search history button" (211) a list of all earlier searches are displayed. The user can easily revert to a previous result set by clicking an item in the list.

When a user has received several result sets in a row, it may be hard for him to find a specific previous one. The bookmark button (212) allows users to mark a result set, thereby differentiating it from other sets and making it easier to revert to at a later point in time.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The process of moving data entries automatically and limiting queries, data categories and others, and displaying such process appropriately, as discussed above, can be implemented by the search engine front end (103) and/or the search engine (102) and/or the operator console (104).

Although the invention has been explained by reference to the above described document management system, it is not limited thereto. It will be clear to the skilled person that other embodiments are possible within the scope of the claims.

The invention claimed is:

1. An information retrieval system comprising:
   memory means for storing a set of predefined queries and a set of predefined data categories;
   first selection means for selecting a predefined query from the set of predefined queries;
   second selection means for selecting at least one data category from the set of predefined categories;
   first limiting means for limiting the set of predefined queries upon selection by a user of predefined categories;
   second limiting means for limiting the set of predefined categories upon selection by a user of a predefined query;
   data entry means for entering at least one first data item by a user, and for associating the at least one first data item with the at least one selected data category;
   query forming means for forming a query based on the selected predefined query, the at least one selected category and the at least one associated first data item;
   submission means for submitting the formed query;
   receiving means for reception of a result set in response to the submitted query, the result set including records and fields in the records; and
   display means for displaying the received result set.

2. The information retrieval system according to claim 1, where the result set comprises second data items associated with a predefined data category and stored in the fields, and the system further comprises:
   third selection means for selecting a second data item from the result set and for moving the second data item to the data entry means as a first data item in conformance with the associated predefined data category.

3. The information retrieval system according to claim 1, further comprising:
   means for forming a result page with second data items in dependence of the selected predefined query.

4. The information retrieval system according to claim 1, further comprising:
   means for ordering the records and fields in the result page in dependence of the selected predefined query.

5. The information retrieval system according to claim 1, further comprising:
   means for saving the submitted query.

6. The information retrieval system according to claim 1, wherein the system retrieves information related to documents.

7. The information retrieval system according to claim 1, further comprising:
   search means for searching data based on the submitted query and returning the result set to the receiving means.

8. A method for retrieving information from a database system using a computer display device and a user interface that provides output on the computer display device, the method comprising the steps of:

selecting a predefined query from the set of predefined queries;

selecting at least one data category from the set of predefined categories;

limiting the set of predefined queries upon selection by a user of predefined categories;

limiting the set of predefined categories upon selection by a user of a predefined query;

entering at least one first data item by a user;

associating the at least one first data item with the at least one selected data category;

forming a query based on the selected predefined query, the at least one selected category and the at least one associated first data item;

submitting the formed query;

receiving a result set in response to the submitted query, the result set including records and fields in the records; and displaying the received result set.

9. The method according to claim 8, further comprises the steps of:

limiting the set of user selectable categories, upon selection of a predefined query; and limiting the set of user selectable predefined queries, upon selection of a user selectable category.

10. The method according to claim 8, further comprising the steps of:

limiting the set of user selectable queries, upon selection of a result item by the user from the result set;

submitting a next query based on user selected predefined query and the result item, upon a next confirmation by a user; and displaying the next result set, upon reception of a next result set in response to the submitted next query.

11. A computer program product embodied on at least one computer-readable storage medium, for retrieving information from a storage using a display device and a user input device, the computer program product comprising computer-executable instructions for:

selecting a predefined query from the set of predefined queries;

selecting at least one data category from the set of predefined categories;

limiting the set of predefined queries upon selection by a user of predefined categories;

limiting the set of predefined categories upon selection by a user of a predefined query;

entering at least one first data item by a user;

associating the at least one first data item with the at least one selected data category;

forming a query based on the selected predefined query, the at least one selected category and the at least one associated first data item;

submitting the formed query;

receiving a result set in response to the submitted query, the result set including records and fields in the records; and displaying the received result set.

12. The product according to claim 11, further comprising computer-executable instructions for:

limiting the set of user selectable categories, upon selection of a predefined query; and limiting the set of user selectable predefined queries, upon selection of a user selectable category.

13. The product according to claim 11, further comprising computer-executable instructions for:

limiting the set of user selectable queries, upon selection of a result item by the user from the result set;

submitting a next query based on user selected predefined query and the result item, upon a next confirmation by a user; and displaying the next result set, upon reception of a next result set in response to the submitted next query.

14. The product according to claim 11, further comprising computer-executable instructions for:

searching data based on the submitted query and returning the result set for display.

15. An information retrieval system comprising:

memory means for storing a set of predefined queries and a set of predefined data categories;

display means for displaying the set of predefined queries and for displaying the set of predefined data categories;

first selection means for selecting a predefined query from the set of predefined queries;

second selection means for selecting at least one data category from the set of predefined categories;

first limiting means for limiting the set of predefined queries upon selection by a user of predefined categories;

second limiting means for limiting the set of predefined categories upon selection by a user of a predefined query;

data entry means provided on the display means for entering at least one first data item by a user, and for associating the at least one first data item with the at least one selected data category;

query forming means provided on the display means for forming a query based on the selected predefined query, the at least one selected category and the at least one associated first data item;

submission means provided on the display means for submitting the formed query; means for limiting the number of user selectable data categories depending on a selected predefined query by graying out display elements corresponding to certain user selectable data categories;

receiving means for reception of a result set in response to the submitted query, the result set including records and fields in the records; and display means for displaying the received result set.

* * * * *